United States Patent [19]

Jones et al.

[11] Patent Number: 5,024,827
[45] Date of Patent: Jun. 18, 1991

[54] FINE PARTICULATE MATERIAL

[75] Inventors: William J. Jones, Middlesbrough; Ian P. Appleyard, Stockton on Tees, both of England

[73] Assignee: Tioxide Group, PLC, England

[21] Appl. No.: 357,793

[22] Filed: May 30, 1989

[30] Foreign Application Priority Data

May 28, 1988 [GB] United Kingdom ............... 8812759

[51] Int. Cl.$^5$ ............................................. C01G 23/047
[52] U.S. Cl. .................................... 423/610; 423/611
[58] Field of Search ............... 423/610, 611, 612, 615, 423/616, 613, 614, 85; 106/436, 437; 502/350, 527; 501/134, 136

[56] References Cited

U.S. PATENT DOCUMENTS

| | | | |
|---|---|---|---|
| 2,489,246 | 11/1949 | Wainer | 423/610 |
| 3,329,484 | 7/1967 | Long et al. | 423/611 |
| 3,338,677 | 8/1967 | Berry | 423/610 |
| 3,549,322 | 12/1970 | Klein et al. | 423/85 |
| 3,579,310 | 5/1971 | Lewis et al. | 423/610 |
| 3,632,527 | 1/1972 | Alpert et al. | 423/85 |
| 3,703,357 | 11/1972 | Surls et al. | 106/436 |
| 3,709,984 | 1/1973 | Dantro | 423/610 |
| 3,796,793 | 3/1974 | Metzer et al. | 423/610 |
| 3,856,929 | 12/1974 | Angerman | 423/610 |
| 3,892,897 | 7/1975 | Rittler | 423/247 |
| 3,923,968 | 12/1975 | Basque | 423/610 |
| 3,984,524 | 10/1976 | Alexandrov et al. | 423/266 |
| 4,095,993 | 6/1978 | Preston | 106/436 |
| 4,623,396 | 11/1986 | Kimura et al. | 106/417 |
| 4,663,305 | 5/1987 | Mauldin et al. | 502/304 |
| 4,885,034 | 12/1989 | Kreth et al. | 106/447 |

FOREIGN PATENT DOCUMENTS

| | | | |
|---|---|---|---|
| 658984 | 3/1963 | Canada | 423/610 |
| 782530 | 4/1968 | Canada | 423/612 |
| 0113625 | 9/1980 | Japan | 423/610 |
| 861802 | 3/1961 | United Kingdom | 423/610 |
| 1142974 | 2/1969 | United Kingdom | 423/610 |

OTHER PUBLICATIONS

Barksdale, *Titanium*, 1966, 2nd ed., p. 11.
Grant, et al., Grant & Hackh's Chem. Dic., 1987, 5th ed., p. 581.
Nakano, et al., Chem. Abs. 84:139857n, 1975, "Manufacture of Ceramic Conductor".
*CRC HdbK. of Chem. and Phy.*, Weast, 1972, p. B-149.
Oota, et al., "Vapor Phase Growth of Titania Whiskers by Hydrolysis of Titanium Fluoride," 1984, vol. 66, pp. 262–268.
Izumi, et al., "Growth of Anatase (TiO$_2$) ) Crystals by Chemical Transport Reactions with HBr and HCl," 1979, vol. 47, pp. 136–144.

*Primary Examiner*—Michael L. Lewis
*Assistant Examiner*—Steven Bos
*Attorney, Agent, or Firm*—Banner, Birch, McKie & Beckett

[57] ABSTRACT

A new form of titanium dioxide has been developed in which the particles have a substantially rectangular cross-section with a width to length ratio of at least 0.8:1.0. A most desirable cubic form of anatase titanium dioxide is included. The products are formed by hydrolyzing a solution containing TiOCl$_2$ species under autothermal pressure.

9 Claims, No Drawings

FINE PARTICULATE MATERIAL

This invention relates to fine particulate material and particularly to titanium dioxide and more particularly to anatase titanium dioxide of a particular crystal habit and a method for the manufacture thereof.

According to the present invention fine particulate material comprises titanium dioxide the particles of which have a cross-section which is substantially rectangular so that the particles have a width to length ratio of at least 0.8:1.0 and that the particles have an average particle size of from 10 nm to 250 nm.

The product of the invention is titanium dioxide, usually anatase titanium dioxide, in which at least 80% by weight of the titanium dioxide is present in the anatase form and preferably at least 95% by weight of the $TiO_2$ is in the anatase form.

The particles of the product of the invention have a cross-section which is substantially rectangular in form so that the width to length ratio is at least 0.8:1. Preferably the third dimension (thickness) of the particles is similar to the width and thus in the most ideal case the particles are said to be substantially cubic. Preferably the ratio of the width to the length is at least 0.9:1. The term length is used to signify the largest dimension and the width is the next largest dimension.

The particles have an average particle size of from 10 nanometres to 250 nanometres i.e. from the small to pigmentary size. Pigmentary products will have a size of from 200 nm to 230 nm.

The products of the invention are obtained by a new method for making titanium dioxide products in which a solution containing $TiOCl_2$ is heated under autothermal pressure in the presence of fluoride ions and nuclei to hydrolyse the $TiOCl_2$ to precipitate titanium dioxide in the anatase and substantially cubic form.

The solution of $TiOCl_2$ species which is used as the source of the product of the invention can be obtained by a number of ways. One way involves the digestion of a titaniferous ore, particularly an unweathered ilmenite containing a low amount of iron in the ferric state, preferably less than 4% by weight, with hydrochloric acid, to produce a crude liquor. Typically the hydrochloric acid will be so-called concentrated acid having a weight for weight concentration of at least 30% HCl and preferably at least 35% w/w HCl. Depending on the constitution of the ore normally the digestion is carried out employing an acid to ore weight ratio of at least 1.35:1 and preferably about 1.5:1 with the amount of acid expressed as weight of HCl. The digestion is carried out at an elevated temperature usually greater than 60° C., say 60° C. to 90° C., preferably 70° C. to 80° C., for a period of usually greater than 1.0 hour until the desired level of extraction of the titanium has occurred.

The crude liquor obtained contains the titanium species in a form which is usually considered to be $TiOCl_2$ although this invention is not dependent on the correctness of this understanding. The liquor contains in addition to the analysable $TiOCl_2$ species quantities of iron in the ferrous and ferric forms and HCl. Preferably any ferric iron is reduced with an added metal, such as iron or zinc to the ferrous form. If desired the liquor can then be cooled to crystallise iron chloride followed by flocculation and filtration.

Alternatively the solution of $TiOCl_2$ species can be obtained by hydrolysing a titanium halide, e.g. titanium tetrachloride in water acidified with hydrochloric acid. This method has the advantage that few impurities, if any, are present in the solution obtained.

The solution of the $TiOCl_2$ species is then heated at an elevated temperature and under a self-generated pressure in the presence of fluoride ions and nuclei to hydrolyse the titanium species and to precipitate the required titanium dioxide in the anatase form and substantially in the cubic form or habit.

The nuclei usually will be small particles of titanium dioxide or a hydrate thereof which can be formed from a part of the solution of $TiOCl_2$ which is to be hydrolysed or can be generated from another source such as a solution of titanium tetrachloride, and regardless of which, they are subjected to a separate hydrolysis stage to form the very small particles of titanium dioxide required. These very small particles are used as the "seed" for the hydrolysis of the $TiOCl_2$ solution.

The hydrolysis under pressure is also carried out in the presence of fluoride ions and as a source of these ions any appropriate water-soluble fluoride can be used such as a fluoride of an alkali metal or of ammonia or, indeed, hydrofluoric acid itself. Ammonium bifluoride (ammonium hydrogen difluoride) has been found to be a convenient source of the fluoride ions.

Generally speaking the hydrolysis under pressure is carried out in the presence of the nuclei of titanium dioxide in an amount of from 0.03 to 3.0 per cent by weight expressed as $TiO_2$ on the weight of $TiOCl_2$ (as $TiO_2$) to be hydrolysed and also in the presence of fluoride ion expressed as F in an amount of from 1.0 to 15 per cent by weight of $TiOCl_2$ (as $TiO_2$) in the solution to be hydrolysed, preferably 8 to 12 per cent.

The nuclei and the source of fluoride ions can be added to the solution of $TiOCl_2$ at any convenient stage. The additions can be made before heating of the solution is commenced or during the heating process and the precise time and mode of addition will depend on the particular way in which the hydrolysis and precipitation is effected.

The reaction to effect the hydrolysis and precipitation of the product of the invention may be carried out in a batchwise manner or continuously. When a batchwise operation is employed then the reaction is conveniently carried out in a pressure vessel equipped with stirring means and usually all the necessary ingredients are added prior to the commencement of the reaction which is effected by heating the solution in the vessel which is so constructed to resist the pressure generated by the heating of the solution in the closed vessel.

Alternatively the reaction may be carried out continuously in say a tubular reaction vessel equipped with intial pumping means to effect the passage of the solution through the reactor and pressure reducing means to allow the products to be removed continuously from the reactor and reduced to atmospheric pressure. The nuclei and the source of fluoride ions may be mixed with the solution of $TiOCl_2$ to be heated prior to passage through the reactor or may be added to the reactor at any desirable point or points.

Usually the continuous reactor will be equipped with suitable mixing means and, similar to the batch reactor will be formed of a material which is resistant to attack by the acidic contents of the reactor. Suitable materials of construction are metallic e.g. nickel based alloys and tantalum metal and non-metallic materials e.g. polymeric materials and ceramics.

Usually the solution of the $TiOCl_2$ is heated at a reaction temperature of up to 200° C. under the pressure so generated for a period of from 10 to 30 minutes. The time to heat the solution up to the reaction temperature has been found to be longer for a batch process than for a continuous process.

After reaction has been completed the precipitated substantially cubic anatase titanium dioxide is separated from the mother liquor, washed and dried. If desired the product can be calcined at a temperature greater than 500° C., e.g. at a temperature in the range 800° C. to 950° C. In the absence of a rutilising agent calcination will produce a product retaining its anatase characteristics.

The product of the invention can be used when in the form of small particle sized material as an absorber of UV light which is also transparent to visible light.

The invention is illustrated in the following Examples.

EXAMPLE 1

595 g of ilmenite (Analysis 44% $TiO_2$, 35% FeO, 13% $Fe_2O_3$) was added to 2200 mls 35% HCl, which has been heated to 65° C. The resultant mixture was kept at 65° C. for 2 hours after which iron powder (33 g) was added over a further one hour. The liquor was then flocculated and allowed to cool to ambient temperature when it was filtered to remove unreacted ilmenite and other solids. The liquor obtained, 1650 mls, contained 147 gpl $TiO_2$, 93 gpl Fe and 411 gpl HCl. 22.8 g ammonium hydrogen difluoride ($NH_4HF_2$) was dissolved in the liquor and 5.3 mls of a nuclei slurry (43.4 gpl $TiO_2$) was added.

The nuclei slurry was made by adding an aqueous solution of $TiCl_4$ (200 gpl $TiO_2$ and acid:titanium ratio of 1.79) rapidly to aqueous NaOH to reduce the acid:-titanium ratio to 0.29. The mixture was heated at a rate of 1° C. per minute to 82° C. and held there for 30 minutes while stirring continuously. The mixture was quenched with cold water and finally the pH of the nuclei slurry adjusted to 7.5.

The total volume of the liquor was heated in an autoclave to 200° C. and held there for 30 minutes to hydrolyse the solution and to precipitate a pulp of titanium dioxide.

The pulp was removed by centrifugation and washed twice with 10% HCl at 70° C. followed by a final displacement wash with acetone. The solid was dried at 110° C. overnight. Substantially cubic anatase titanium dioxide (223.3 g) was obtained having a crystal size of 78 nm.

This sample was then calcined at 900° C. for 1½ hours after which it retained its substantially cubic form but the crystal size was increased to 140 nm.

EXAMPLE 2

The liquor was prepared as in Example 1 adding the $NH_4HF_2$ and nuclei as described in Example 1, and pumped continuously through a heated pipe pressure reactor. The temperature of the fluid was 190° C. and the flow rate was such as to give a residence time in the pipe of 10-20 minutes. The product slurry was cooled in a double pipe heat exchanger and collected in a receiving vessel. The product slurry was then filtered, washed and dried at 130° C. overnight to produce substantially cubic anatase titanium dioxide.

We claim:

1. Fine particulate material consisting essentially of titanium dioxide the particles of which have a cross-section which is substantially rectangular so that the particles have a width to length ratio of at least 0.8:1.0 and that the particles have an average particle size of from 10 nm to 250 nm.

2. Fine particulate material according to claim 1 in which at least 80% by weight of the titanium dioxide is present in the anatase form.

3. Fine particulate material according to claim 1 in which at least 95% by weight of the titanium dioxide is present in the anatase form.

4. Fine particulate material according to claim 1 in which the particles have a thickness similar in size to the width.

5. Fine particulate material according to claim 1 in which the ratio of the width to the length is at least 0.9:1.

6. Fine particulate material according to claim 1 in which the particles have an average particle size of from 200 nm to 230 nm.

7. Fine particulate material consisting essentially of titanium dioxide the particles of which have a cross-section which is substantially rectangular so that the particles have a width to length ratio of at least 0.8:1.0 and that the particles have an average particle size of from 10 nm to 250 nm. material prepared by a method comprising heating under auto-thermal pressure a solution containing $TiOCl_2$ species in the presence of fluoride ions and nuclei formed of titanium dioxide or a hydrate thereof to hydrolyze said $TiOCl_2$ species to precipitate titanium dioxide.

8. Particulate material according to claim 7, wherein said solution containing said $TiOCl_2$ is prepared by digesting a titaniferous ore with hydrochloric acid at a temperature greater than 60° C. until the desired level of extraction of the titanium within the ore has occurred.

9. Particulate material according to claim 7, wherein said solution containing said $TiOCl_2$ species is obtained by hydrolyzing a titanium halide in water acidified with hydrochloric acid.

* * * * *